(12) United States Patent
Shiue et al.

(10) Patent No.: US 11,120,645 B2
(45) Date of Patent: Sep. 14, 2021

(54) SYSTEM FOR REMOTELY MONITORING AN AUTONOMOUS VEHICLE AND METHOD USING THE SAME

(71) Applicant: AUTOMOTIVE RESEARCH & TESTING CENTER, Changhua County (TW)

(72) Inventors: Yu-Chi Shiue, Changhua County (TW); Kuang-Jen Chang, Changhua County (TW); Chin-Shao Tu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 16/826,668

(22) Filed: Mar. 23, 2020

(65) Prior Publication Data
US 2021/0183171 A1    Jun. 17, 2021

(30) Foreign Application Priority Data

Dec. 13, 2019    (TW) ................................. 108145743

(51) Int. Cl.
| | | |
|---|---|---|
| G07C 5/00 | (2006.01) | |
| H04L 29/08 | (2006.01) | |
| G07C 5/08 | (2006.01) | |
| G05D 1/02 | (2020.01) | |
| G05D 1/00 | (2006.01) | |

(52) U.S. Cl.
CPC .......... *G07C 5/008* (2013.01); *G07C 5/0816* (2013.01); *H04L 67/12* (2013.01); *G05D 1/0088* (2013.01); *G05D 1/0231* (2013.01); *G05D 1/0257* (2013.01)

(58) Field of Classification Search
None
See application file for complete search history.

(56) References Cited

U.S. PATENT DOCUMENTS

| | | | |
|---|---|---|---|
| 2016/0133130 A1* | 5/2016 | Grimm | ................... H04W 4/80 340/905 |
| 2020/0065711 A1* | 2/2020 | Clement | ................... G06N 3/08 |

* cited by examiner

*Primary Examiner* — Adolf Dsouza
(74) *Attorney, Agent, or Firm* — Rosenberg, Klein & Lee

(57) ABSTRACT

A system for remotely monitoring an autonomous vehicle and a method using the same is disclosed. The system includes a filtering unit, a message converting unit, and an abnormality analyzing module. The filtering unit retrieves the raw vehicle-body data of the on-board system information and filters out the raw vehicle-body data unsatisfying with a threshold value to generate vehicle-parameter information. The message converting unit receives the vehicle-parameter information and estimates vehicle-body environment information based on the vehicle-parameter information. The abnormality analyzing module receives the vehicle-parameter information and the vehicle-body environment information, incorporates the vehicle-parameter information and the vehicle-body environment information into a comparison condition to generate a comparison result, generates an abnormality warning signal corresponding to the comparison result, and transmits the abnormality warning signal to a far-end server to display it.

20 Claims, 6 Drawing Sheets

SYSTEM FOR REMOTELY MONITORING AN AUTONOMOUS VEHICLE AND METHOD USING THE SAME

This application claims priority for Taiwan patent application no. 108145743 filed on 13 Dec. 2019, the content of which is incorporated by reference in its entirely.

BACKGROUND OF THE INVENTION

Field of the Invention

The present invention relates to an on-board cooperative control system, particularly to a system for remotely monitoring an autonomous vehicle and a method using the same, which effectively analyze the state of an on-board system.

Description of the Related Art

Autonomous Drive System (ADS) is an unmanned self-driving system. Generally, the ADS needs to sense vehicle-body information and environmental information using various environmental sensors, such as vehicle-speed sensors, steering-angle sensors, image sensors, and radar sensors. The ADS generates signals to automatically control and drive a vehicle based on the vehicle-body information and the environmental information.

Presently, most of the autonomous driving technology collects data and performs diagnosis and analysis for malfunction or abnormality on the data when sensors fail instead of estimating that the sensors may malfunction before the abnormality of sensors occurs. Alternatively, most of the present autonomous driving system does not issue a warning until the clear failure of sensors or vehicle dynamic states occurs. For example, image sensors or radar sensors cannot receive the signal at all, or the signal transmission is delayed by more than one minute. The control system will stop performing an automatic driving mode after receiving the command. However, when the system detects an abnormality, the erroneous information has been used as the parameters of the automatic driving mode, so that an erroneous automatic driving control signal has been generated to seriously threaten the safety of drivers and other passers-by.

Furthermore, with the development of autonomous driving technology, developers have developed fleets of self-driving vehicles to replace fleets of manually-driving vehicles. The fleets of self-driving vehicles receive more information. As a result, if the fleets of self-driving vehicles can collect and statistically analyze data to determine the vehicle's movement and possible problems with the sensors of the automatic driving system when the fleets of self-driving vehicles drive, the control platform at the back end can fully monitor the current status of the self-driving vehicles and directly assist in remotely controlling the self-driving vehicles or vehicle dispatch, which is of significant help to the fleets of self-driving vehicles.

To overcome the abovementioned problems, the present invention provides a system for remotely monitoring an autonomous vehicle and a method using the same.

SUMMARY OF THE INVENTION

The primary objective of the present invention is to provide a system for remotely monitoring an autonomous vehicle and a method using the same, which collect the on-board system information of an on-board system at the back end and estimate the states of all systems mounted in the autonomous vehicle according to the on-board system information, so as to detect the dynamic abnormality for driving the vehicle and the abnormality of sensing systems of the autonomous vehicle in advance, thereby effectively improving the driving safety of the self-driving system.

Another objective of the present invention is to provide a system for remotely monitoring an autonomous vehicle and a method using the same, which are applied to the management of fleets of autonomous vehicles. The present invention collects all big data of autonomous vehicles at the back end and effectively remotely monitors the vehicles, such as recording the movements of vehicles or estimating the driving states of vehicles, thereby managing the fleets of vehicles, remotely controlling vehicles or dispatching vehicles.

To achieve the abovementioned objectives, the present invention provides a system for remotely monitoring an autonomous vehicle. The system receives on-board system information transmitted by an on-board system. The system for remotely monitoring an autonomous vehicle comprises a data processing module, an abnormality analyzing module, and a far-end server. The data processing module comprises a filtering unit and a message converting unit. The filtering unit is configured to retrieve raw vehicle-body data of the on-board system information and filter out the raw vehicle-body data unsatisfying with a threshold value to generate vehicle-parameter information. The message converting unit is coupled to the filtering unit and configured to receive the vehicle-parameter information and estimate vehicle-body environment information based on the vehicle-parameter information. The abnormality analyzing module is coupled to the data processing module and configured to receive the vehicle-parameter information and the vehicle-body environment information, incorporate the vehicle-parameter information and the vehicle-body environment information into a comparison condition to generate a comparison result, and generate an abnormality warning signal corresponding to the comparison result. The far-end server is coupled to the abnormality analyzing module and configured to receive and display the abnormality warning signal.

In an embodiment of the present invention, the abnormality analyzing module further comprises an abnormality estimating unit for snaking, which sets the comparison condition for estimating snaking abnormality. The comparison condition includes a vehicle speed, a steering angle, and a vehicle trajectory retrieved by the abnormality analyzing module after determining the vehicle in a self-driving state according to manual-driving state information or self-driving state information. The abnormality analyzing module determines whether that the vehicle speed is larger than a given real-time vehicle speed, that the steering angle is larger than a given real-time steering angle, and that a different between the vehicle trajectory and a given trajectory is larger than a real-time trajectory error: if yes, generating the abnormality warning signal; and if no, retrieving the position information of the vehicle and comparing the position information with a given historical steering angle and a given historical trajectory, and the abnormality analyzing module generating the abnormality warning signal when the steering angle of the vehicle-parameter information is larger than the given historical steering angle and a difference between the vehicle trajectory and the given historical trajectory is larger than a historical trajectory error.

In an embodiment of the present invention, the abnormality analyzing module further comprises a state estimating unit for battery health, which sets the comparison condition for estimating battery health, the comparison condition includes the state of decreasing charge retrieved by the abnormality analyzing module, and the abnormality analyzing module determining whether a state of decreasing charge is larger than a given state of decreasing charge: if yes, generating the abnormality warning signal; and if no, further comparing the state of decreasing charge of the vehicle-parameter information with a given historical state of decreasing charge, and the abnormality analyzing module generating the abnormality warning signal when the state of decreasing charge of the vehicle-parameter information is larger than the given historical state of decreasing charge.

In an embodiment of the present invention, the abnormality analyzing module further comprises an abnormality estimating unit for detecting distances of obstructions, which sets the comparison condition for detecting distances of obstructions. The comparison condition includes distances of obstructions received by the abnormality analyzing module at the same time point. The abnormality analyzing module generates the abnormality warning signal when the distances of obstructions estimated by one of lidar information, radar information, and camera information non-correspond to the distances of obstructions estimated by the remains of the lidar information, the radar information, and the camera information at the same time point.

In an embodiment of the present invention, the abnormality analyzing module further comprises an abnormality estimating unit for detecting the number of obstructions, which sets the comparison condition for detecting the number of obstructions. The comparison condition includes the number of obstructions received by the abnormality analyzing module at the same time point. The abnormality analyzing module generates the abnormality warning signal when the number of obstructions estimated by one of the lidar information, the radar information, and the camera information non-corresponds to the number of obstructions estimated by the remains of the lidar information, the radar information, and the camera information at the same time point.

In an embodiment of the present invention, the abnormality analyzing module further comprises an abnormality estimating unit for detecting varieties of obstructions, which sets the comparison condition for detecting varieties of obstructions. The comparison condition includes the varieties of obstructions received by the abnormality analyzing module at the same time point. The abnormality analyzing module generates the abnormality warning signal when one of the varieties of obstructions non-corresponds to the remains of the varieties of obstructions at the same time point.

In an embodiment of the present invention, the abnormality analyzing module further comprises an abnormality estimating unit for detecting signal delays of obstructions, which sets the comparison condition for detecting signal delays of obstructions. The comparison condition includes either the appearing time and the relative distances thereof of obstructions received by the abnormality analyzing module at the same time point. The abnormality analyzing module generates the abnormality warning signal when either the appearing time and the relative distances thereof of obstructions estimated by one of the lidar information, the radar information, and the camera information non-correspond to either the appearing time and the relative distances thereof of obstructions estimated by the remains of the lidar information, the radar information, and the camera information at the same time point.

In an embodiment of the present invention, the abnormality analyzing module further comprises a dynamic abnormality estimating unit, which sets the comparison condition for estimating dynamic abnormality, and the abnormality analyzing module determining whether the vehicle speed and power output correspond to a power graph: if no, generating the abnormality warning signal.

The present invention also provides a method for remotely monitoring an autonomous vehicle comprising: receiving on-board system information; retrieving raw vehicle-body data of the on-board system information and filtering out the raw vehicle-body data unsatisfying with a threshold value to generate vehicle-parameter information; estimating vehicle-body environment information based on the vehicle-parameter information; and incorporating the vehicle-parameter information and the vehicle-body environment information into a comparison condition to generate a comparison result and generating an abnormality warning signal corresponding to the comparison result.

Below, the embodiments are described in detail in cooperation with the drawings to make easily understood the technical contents, characteristics and accomplishments of the present invention.

DETAILED DESCRIPTION OF THE INVENTION

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, the system for remotely monitoring an autonomous vehicle of the present invention may be installed at the control platform of the back end. The system for remotely monitoring an autonomous vehicle receives all big data detected by on-board systems of all autonomous vehicles and effectively performs statistics on the movements of the vehicles, such that monitoring staffs at the back end monitor the real-time driving states of the autonomous vehicles and estimate the states of all systems mounted in the autonomous vehicle according to the on-board system information, so as to detect the dynamic abnormality for driving the vehicle and the abnormality of sensing systems of the autonomous vehicle in advance, thereby effectively improving the driving safety of the self-driving system.

Figure 1:
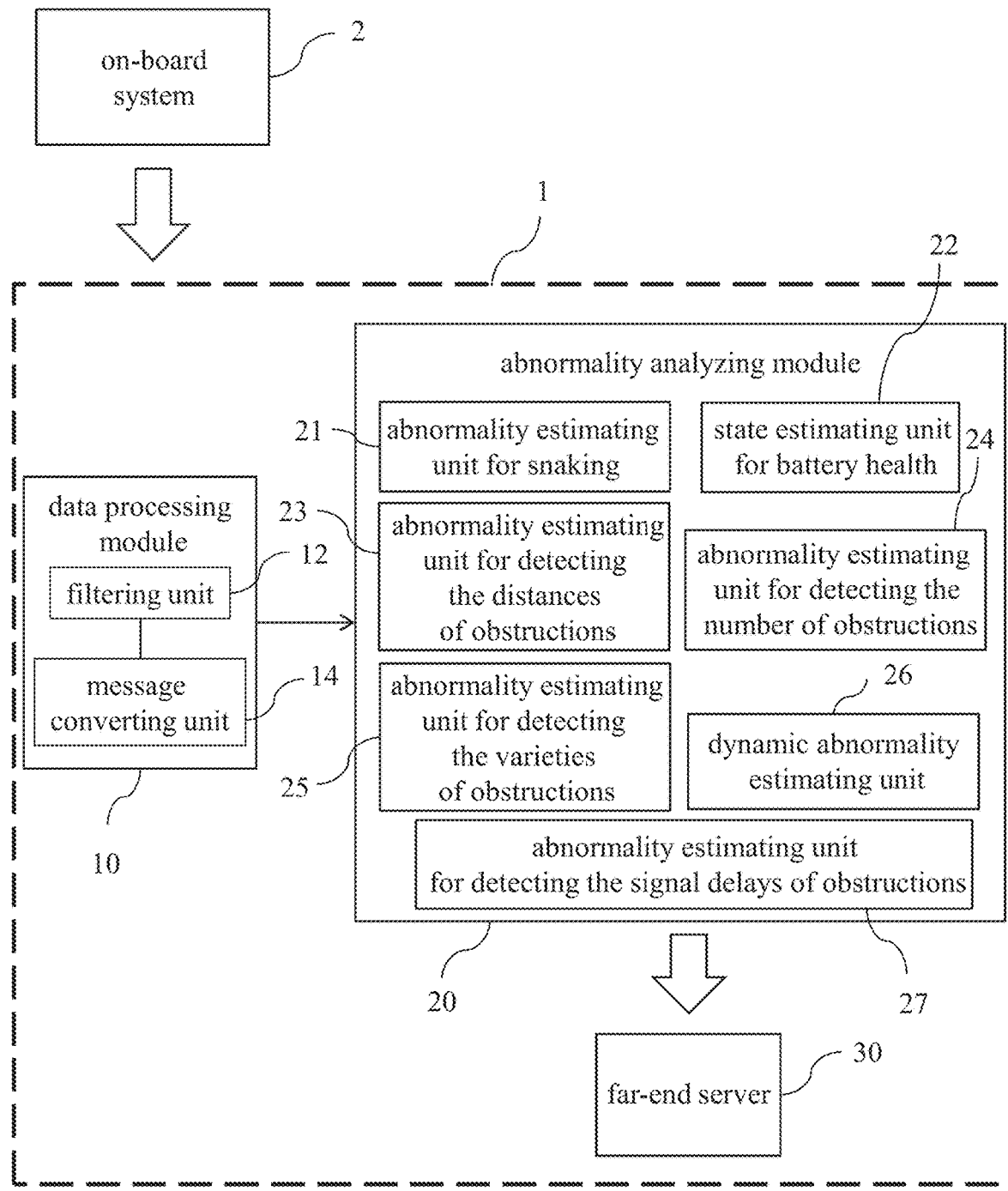
FIG. 1 is a diagram illustrating a system for remotely monitoring an autonomous vehicle according to an embodiment of the present invention.

Referring to FIG. 1, the system 1 for remotely monitoring an autonomous vehicle of the present invention is detailed as follows. The system 1 receives the on-board system information transmitted by an on-board system 2 mounted in an autonomous vehicle in a wireless or wired way. The system 1 for remotely monitoring an autonomous vehicle sets various abnormal conditions for a vehicle-body control system, a sensing system, and an on-board communication system and more strictly determines whether the dynamic chassis and vehicle-body control of a vehicle-body control system, the decision-making system, the sensing system, and the positioning system of an autonomous driving system, or the data transmission of the on-board communication system is abnormal.

As shown in FIG. 1, the system 1 for remotely monitoring an autonomous vehicle may be applied to a computer having functions of calculation and storage, so as to estimate and store various on-board information. The system 1 for remotely monitoring an autonomous vehicle comprises a data processing module 10, an abnormality analyzing module 20, and a far-end server 30. The data processing module 10 is coupled to the on-board system 2. For example, the data processing module 10 is in communication with the on-board system 2. The data processing module 10 receives the on-board system information transmitted by the on-board system 2. The data processing module 10 comprises a filtering unit 12 and a message converting unit 14, wherein the filtering unit 12 is coupled to the message converting unit 14. The filtering unit is configured to retrieve the raw vehicle-body data of the on-board system information and filter out the raw vehicle-body data unsatisfying with a threshold value to generate vehicle-parameter information. The vehicle-parameter information includes information of a state of charge (SOC), information of a vehicle speed, information of a steering angle, position information, lidar information, radar information, camera information, braking information, information of power output, either manual-driving state information or self-driving state information, mileage information, and information of diagnosing an on-board system. The message converting unit 14 receives the vehicle-parameter information generated by the filtering unit 12 and estimates vehicle-body environment information based on the vehicle-parameter information. The vehicle-body environment information includes information of a vehicle trajectory, information of a state of decreasing charge, information of distances of obstructions, information of the number of obstructions, information of varieties of obstructions, and information of appearing time and relative distances thereof of obstructions. The message converting unit 14 is configured to estimate the vehicle trajectory based on the vehicle speed and the steering angle, estimate the state of decreasing charge based on the SOC and the mileage information, estimate the distances of obstructions, the number of obstructions, and either the appearing time and the relative distances thereof of obstructions based on the lidar information, the radar information, and the camera information, and estimate the varieties of obstructions based on the camera information.

The abnormality analyzing module 20 is coupled to the data processing module 10. The abnormality analyzing module 20 receives the vehicle-parameter information and the vehicle-body environment information, which are generated by the data processing module 10. The abnormality analyzing module 20 incorporates the vehicle-parameter information and the vehicle-body environment information into a comparison condition to generate a comparison result. The abnormality analyzing module 20 generates an abnormality warning signal corresponding to the comparison result. The abnormality analyzing module 20 comprises an abnormality estimating unit 21 for snaking, a state estimating unit 22 for battery health, an abnormality estimating unit 23 for detecting the distances of obstructions, an abnormality estimating unit 24 for detecting the number of obstructions, an abnormality estimating unit 25 for detecting the varieties of obstructions, a dynamic abnormality estimating unit 26, and an abnormality estimating unit 27 for detecting the signal delays of obstructions. These abnormality estimating units 21-27 may set various abnormal conditions of a vehicle-body control system, a sensing system, and an on-board communication system and strictly determines whether the dynamic chassis and vehicle-body control of a vehicle-body control system, the decision-making system, the sensing system, and the positioning system of an autonomous driving system is abnormal, or the data transmission of the on-board communication system is abnormal.

The far-end server 30 may be a computer installed at the back end and include a display (not shown). The far-end server 30 is coupled to the abnormality analyzing module 20. The far-end server 30 receives the abnormality warning signal, which is generated by the abnormality analyzing module 20. The far-end server 30 uses the display to display the abnormality warning signal and provides the abnormality warning signal for monitoring staffs at the back end to conduct the corresponding solutions in time. Besides, the far-end server 30 further receives the on-board system information generated by the on-board system 2 and displays the information of diagnosing the on-board system 2, such as trajectories of the autonomous vehicle, detecting no signal of sensors, shutting down the autonomous driving system, or abnormalities of data transmission, such that the monitoring staffs monitor the present states of all systems of the autonomous vehicle and provide the corresponding solutions.

Figure 2:
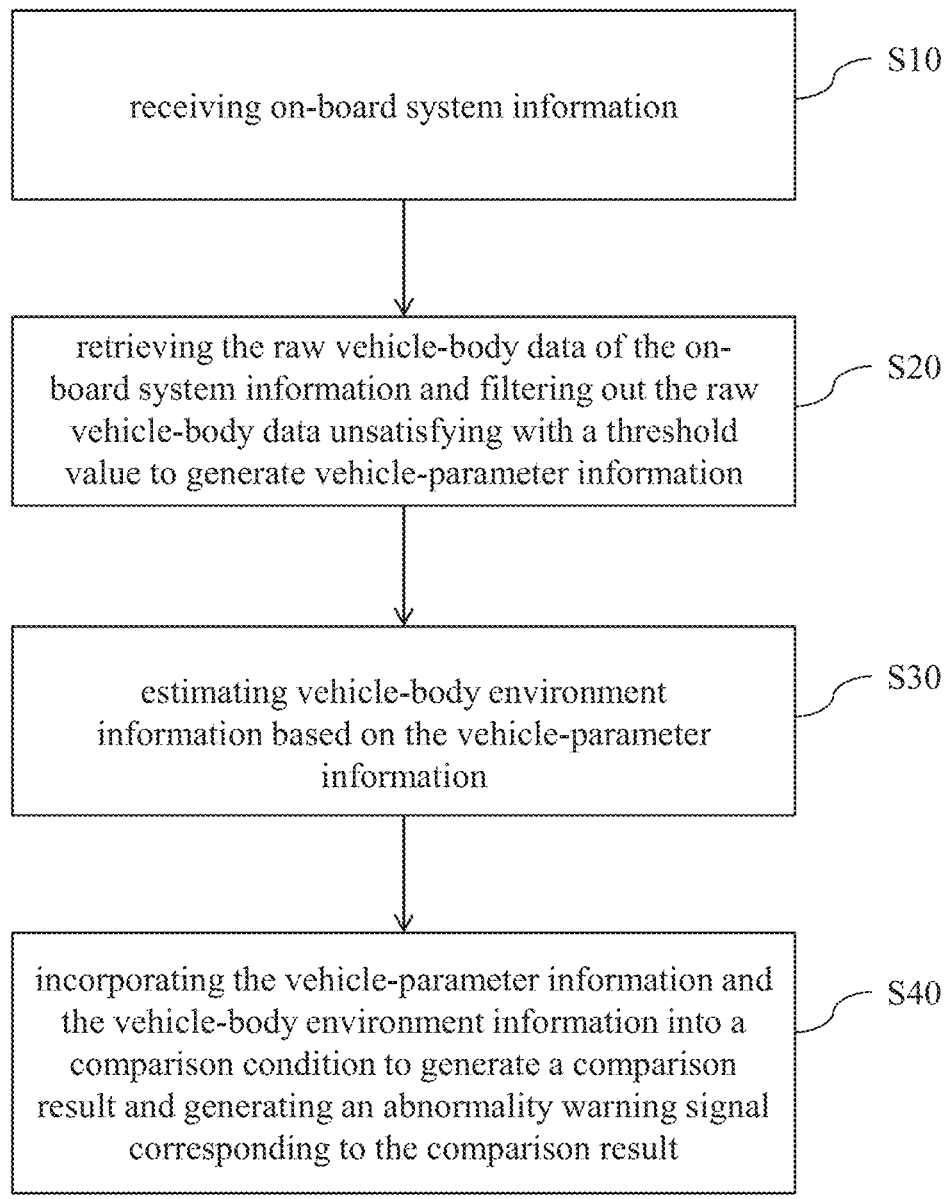
FIG. 2 is a flowchart of a method for remotely monitoring an autonomous vehicle according to an embodiment of the present invention.

After describing the system 1 for remotely monitoring an autonomous vehicle, the method for remotely monitoring an autonomous vehicle using the system 1 for remotely monitoring an autonomous vehicle is described. Referring to FIG. 1 and FIG. 2, in Step S10, the data processing module 10 receives all the on-board information generated by the on-board system 2, such as all trajectories of the autonomous vehicle, vehicle-body parameters, and external environment parameters. In Step S20, the filtering unit 12 of the data processing module 10 retrieves the raw vehicle-body data of the on-board system information and filter out the raw vehicle-body data unsatisfying with a threshold value to generate vehicle-parameter information. For example, the filtering unit 12 may choose the raw vehicle-body data that a user sets and wants, such as information of a state of charge (SOC), information of a vehicle speed, information of a steering angle, position information, lidar information, radar information, camera information, braking information, information of power output (e.g., an electricity/acceleration signal), information of diagnosing an on-board system, and either manual-driving state information or self-driving state information (e.g., a manual-driving/self-driving signal, a reason for shutting down an autonomous driving system, and a signal for an autonomous driving emergence button). Then, the filtering unit 12 compares the raw vehicle-body data with the threshold value. In one embodiment, the threshold value may be a threshold value of vehicle speed, a threshold value of state of charge (SOC), a threshold value of total voltage, and a threshold value of total current. Specifically, the maximum or the minimum of the received raw vehicle-body data represents an abnormality. Thus, in one embodiment, a threshold value of vehicle speed, a threshold value of state of charge (SOC), a threshold value of total voltage, and a threshold value of total current are set to the maximum values. For example, the threshold value of vehicle speed is set to 255 kilometer per hour, the threshold value of state of charge (SOC) is set to 100%, the threshold value of total voltage is set to 600 V, and the threshold value of total current is set to 255 A. When the vehicle speed, the SOC, the total voltage, or the total current of the raw vehicle-body data is larger than the set threshold value, the filtering unit 12 filters out the abnormal vehicle speed, the abnormal SOC, the abnormal total voltage, or the abnormal total current of the raw vehicle-body data, such that the remains of the raw vehicle-body data are used as the vehicle-parameter information for analysis.

In Step S30, the filtering unit 12 transmits the vehicle-parameter information to the message converting unit 14. The message converting unit 14 estimates vehicle-body environment information based on the vehicle-parameter information, wherein the vehicle-body environment information includes information of a vehicle trajectory, information of a state of decreasing charge, information of distances of obstructions, information of the number of obstructions, information of varieties of obstructions, and information of appearing time and relative distances thereof of obstructions. The message converting unit 14 estimates the information of the vehicle trajectory based on the information of the vehicle speed and the steering angle. The information of the state of decreasing charge represents that how many percent of the charge of batteries is used after the vehicle has driven. As a result, the information of the state of decreasing charge is estimated based on the state of charge of batteries and the mileage information. The information of the distances of obstructions, the number of obstructions, and either the appearing time and the relative distances thereof of obstructions are estimated based on the lidar information, the radar information, and the camera information respectively. The information of the varieties of obstructions is estimated based on the camera information. The distance of at least one obstruction, the number of obstructions, and either the appearing time and the relative distances thereof of obstructions are estimated based on each of the lidar information, the radar information, and the camera information.

In Step S40, the data processing module 10 generates the reliable vehicle-parameter information and the vehicle-body environment information and transmits that information to the abnormality analyzing module 20. The abnormality analyzing module 20 incorporates the vehicle-parameter information and the vehicle-body environment information into a comparison condition to generate a comparison result, and generates an abnormality warning signal corresponding to the comparison result. Then, the abnormality analyzing module 20 transmits the abnormality warning signal to the far-end server 30. The far-end server 30 displays the abnormality warning signal, which is provided to monitoring staffs. The comparison condition may include a comparison condition for estimating snaking abnormality, a comparison condition for estimating battery health, a comparison condition for detecting the distances of obstructions, a comparison condition for detecting the number of obstructions, a comparison condition for detecting the varieties of obstructions, a comparison condition for detecting the signal delays of obstructions, or a comparison condition for estimating dynamic abnormality. The detailed procedures of the above-mentioned comparison conditions are respectively described as follows.

Figure 3:
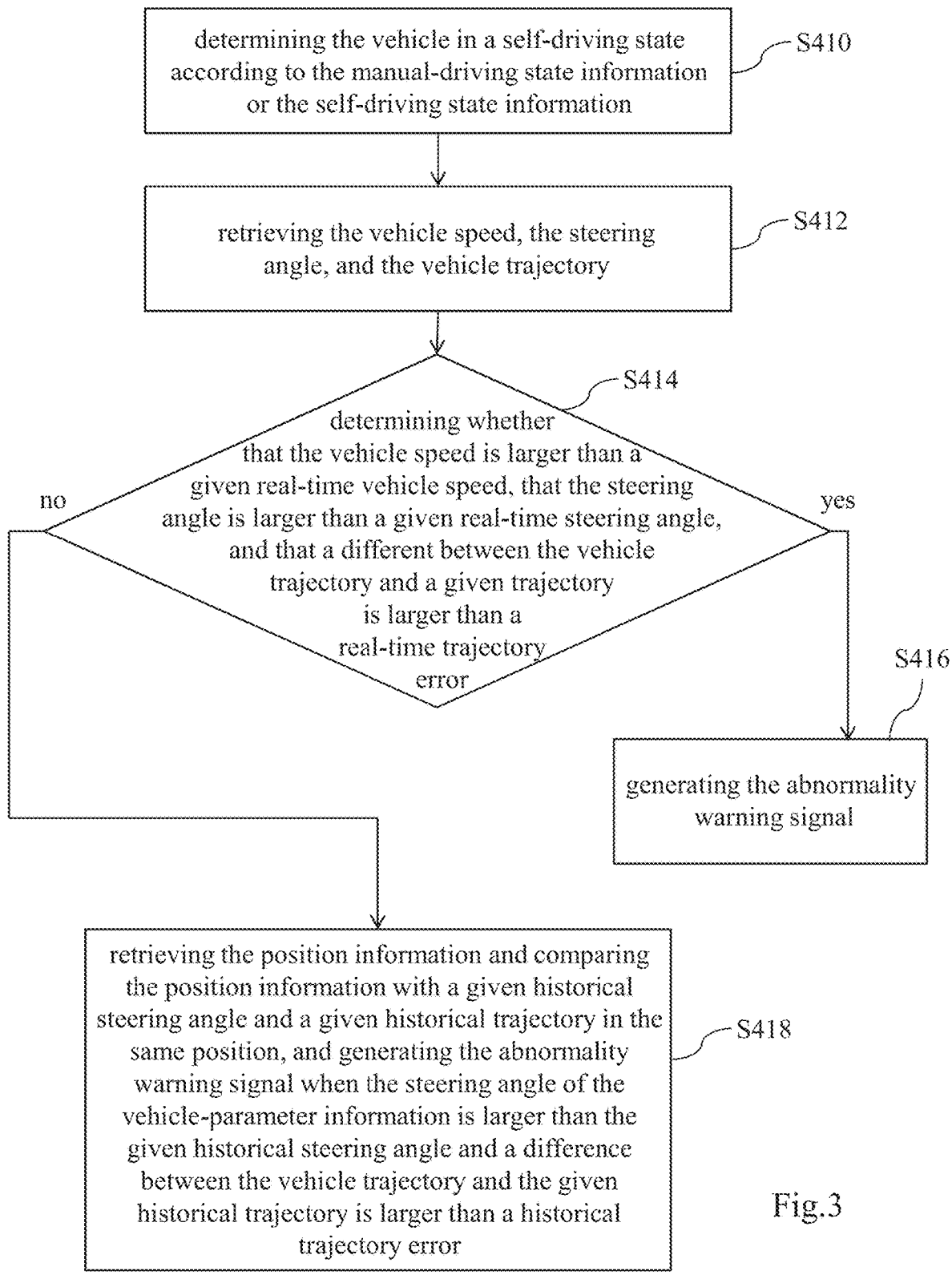
FIG. 3 is a flowchart of using a comparison condition for estimating snaking abnormality to generate a comparison result according to an embodiment of the present invention.

Referring to FIG. 1 and FIG. 3, the procedure of the comparison condition for estimating snaking abnormality is performed in the abnormality estimating unit 21 for snaking and described as follows. In Step S410, the abnormality estimating unit 21 for snaking determines the vehicle in a self-driving state according to the manual-driving state information or the self-driving state information. In Step S412, the abnormality estimating unit 21 for snaking retrieves the vehicle speed, the steering angle, and the vehicle trajectory of the vehicle-parameter information. In Step S414, the abnormality estimating unit 21 for snaking determines whether that the vehicle speed of the vehicle-parameter information is larger than a given real-time vehicle speed, that the steering angle of the vehicle-parameter information is larger than a given real-time steering angle, and that a different between the vehicle trajectory and a given trajectory is larger than a real-time trajectory error. In one embodiment, the given real-time vehicle speed is 20 km/hr, the given real-time steering angle is 5 degrees, the real-time trajectory error is 70 cm. As a result, when the vehicle speed of the vehicle-parameter information is larger than 20 km/hr, the steering angle of the vehicle-parameter information is larger than 5 degrees, and the different between the vehicle trajectory and the given trajectory is larger than 70 cm, the autonomous vehicle has entered into an abnormality driving state for snaking and the procedure proceeds to Step S416. In Step S416, the abnormality estimating unit 21 for snaking generates the abnormality warning signal and transmits it to the far-end server 30, such that the far-end server 30 displays the abnormality warning signal. On contrary, if the answer is no in Step S414, the procedure proceeds to Step S418. In Step S418, the abnormality estimating unit 21 for snaking retrieves the present position information of the vehicle-parameter information and compares the present position information with a given historical steering angle and a given historical trajectory. When the steering angle of the vehicle-parameter information is larger than the given historical steering angle and a difference between the vehicle trajectory and the given historical trajectory is larger than a historical trajectory error, the abnormality estimating unit 21 for snaking generates the abnormality warning signal and transmits it to the far-end server 30, such that the far-end server 30 displays the abnormality warning signal. For example, the abnormality estimating unit 21 for snaking obtains the position of a road according to the position information, so as to obtain historical data corresponding to the road and compares the historical steering angle and the historical trajectory, thereby improving the reliability. In one embodiment, the given historical steering angle is 3 degrees and the historical trajectory error is 50 cm. When the steering angle of the vehicle-parameter information is larger than 3 degrees and the difference between the vehicle trajectory and the given historical trajectory is larger than 50 cm, the abnormality estimating unit 21 for snaking generates the abnormality warning signal and transmits it to the far-end server 30, such that the far-end server 30 displays the abnormality warning signal.

Figure 4:
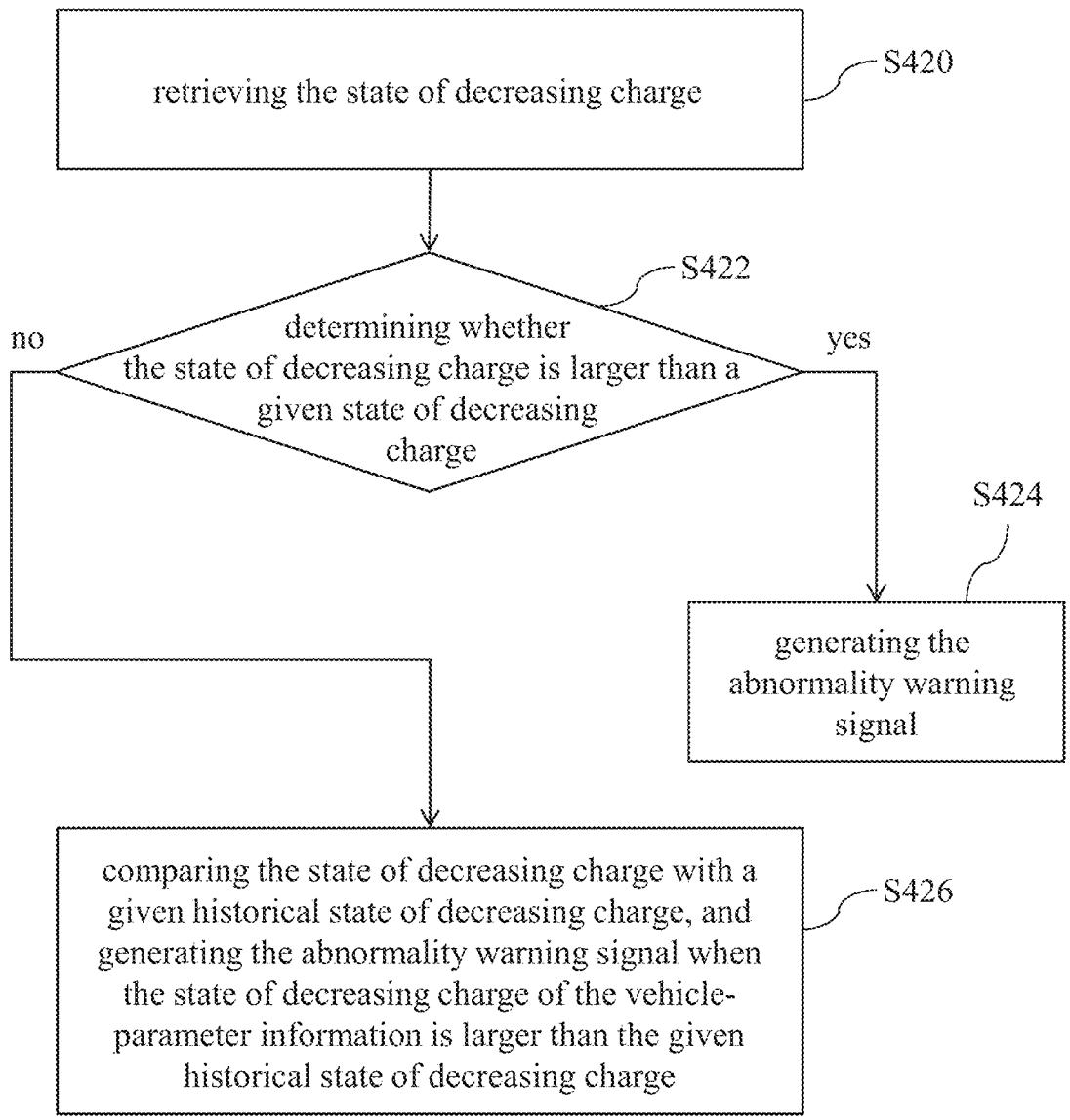
FIG. 4 is a flowchart of using a comparison condition for estimating battery health to generate a comparison result according to an embodiment of the present invention.

Referring to FIG. 1 and FIG. 4, the procedure of the comparison condition for estimating battery health is performed in the abnormality estimating unit 22 for battery health and described as follows. In Step S420, the abnormality estimating unit 22 for battery health retrieves the state of decreasing charge of the vehicle-body environment information. In Step S422, the abnormality estimating unit 22 for battery health determines whether the state of decreasing charge of the vehicle-body environment information is larger than a given state of decreasing charge. If the answer is yes, the procedure proceeds to Step S424. In Step S424, the abnormality estimating unit 22 for battery health generates the abnormality warning signal and transmits it to the far-end server 30, such that the far-end server 30 displays the abnormality warning signal. In one embodiment, the given state of decreasing charge is set to 5% power loss when driving 10 kilometers. Thus, the state of decreasing charge of the vehicle-parameter information is larger than the given historical state of decreasing charge if the state of decreasing charge of the vehicle-parameter information is 10% power loss when driving 10 kilometers. On contrary, if the answer is no in Step S422, the procedure proceeds to Step S426. In Step S426, the abnormality estimating unit 22 for battery health compares the state of decreasing charge of the vehicle-parameter information with a given historical state of decreasing charge. The abnormality estimating unit 22 for battery health generates the abnormality warning signal when the state of decreasing charge of the vehicle-parameter information is larger than the given historical state of decreasing charge.

The given historical state of decreasing charge represents the past state of decreasing charge. If the past state of decreasing charge is 4% power loss when driving 10 kilometers, the given historical state of decreasing charge is set to 4% power loss when driving 10 kilometers. Therefore, if the state of decreasing charge of the vehicle-parameter information is 6% power loss when driving 10 kilometers, the state of decreasing charge of the vehicle-parameter information is larger than the given historical state of decreasing charge. Thus, the abnormality estimating unit 22 for battery health generates the abnormality warning signal and transmits it to the far-end server 30, such that the far-end server 30 displays the abnormality warning signal.

Referring to FIG. 1, the procedure of the comparison condition for detecting the distances of obstructions is performed in the abnormality estimating unit 23 for detecting the distances of obstructions and described as follows. The abnormality estimating unit 23 for detecting the distances of obstructions receives the distances of obstructions sensed by sensors at the same time point, wherein the information of the distances of obstructions are estimated by the lidar information, the radar information, and the camera information at the same time point. The abnormality estimating unit 23 for detecting the distances of obstructions generates the abnormality warning signal and transmits it to the far-end server 30 whereby the far-end server 30 displays the abnormality warning signal when the distances of obstructions estimated by one of the lidar information, the radar information, and the camera information non-correspond to the distances of obstructions estimated by the remains of the lidar information, the radar information, and the camera information at the same time point. For example, each of the distances of obstructions estimated by the lidar information and the camera information is 10 cm. Each of the distances of obstructions estimated by the radar information is 20 cm. As a result, the distances of obstructions estimated by the lidar information and the camera information are clearly different from the distances of obstructions estimated by the radar information. Thus, the abnormality estimating unit 23 for detecting the distances of obstructions generates the abnormality warning signal and transmits it to the far-end server 30 whereby the far-end server 30 displays the abnormality warning signal. Therefore, the monitoring staffs check whether lidars, cameras, and radars are abnormal according to the abnormality warning signal.

Referring to FIG. 1, the procedure of the comparison condition for detecting the number of obstructions is performed in the abnormality estimating unit 24 for detecting the number of obstructions. The abnormality estimating unit 24 for detecting the number of obstructions determines whether the number of obstructions is abnormal or determines whether perception and fusion are abnormal. The procedure of the comparison condition for detecting the number of obstructions is described as follows. The abnormality estimating unit 24 for detecting the number of obstructions receives the number of obstructions at the same time point, wherein the number of obstructions is estimated by the lidar information, the radar information, and the camera information at the same time point. The abnormality estimating unit 24 for detecting the number of obstructions generates the abnormality warning signal when the number of obstructions estimated by one of the lidar information, the radar information, and the camera information non-corresponds to the number of obstructions estimated by the remains of the lidar information, the radar information, and the camera information at the same time point. For example, the number of obstructions estimated by the lidar information and the camera information is two. The number of obstructions estimated by the radar information is one or zero. As a result, the number of obstructions estimated by the lidar information and the camera information is different from the number of obstructions estimated by the radar information. Thus, the abnormality estimating unit 24 for detecting the number of obstructions generates the abnormality warning signal and transmits it to the far-end server 30 whereby the far-end server 30 displays the abnormality warning signal. The monitoring staffs check whether lidars, cameras, and radars are abnormal according to the abnormality warning signal.

Referring to FIG. 1, the procedure of the comparison condition for detecting the varieties of obstructions is performed in the abnormality estimating unit 25 for detecting the varieties of obstructions and described as follows. The abnormality estimating unit 25 for detecting the varieties of obstructions receives the varieties of obstructions at the same time point, wherein the varieties of obstructions are estimated by the camera information at the same time point. The abnormality estimating unit 25 for detecting the varieties of obstructions generates the abnormality warning signal when one of the varieties of obstructions non-corresponds to the remains of the varieties of obstructions at the same time point. For example, two of the varieties of obstructions are motorcycles and one of the varieties of obstructions is car. That is to say, one of the varieties of obstructions is different from the remains of the varieties of obstructions. Thus, the abnormality estimating unit 25 for detecting the varieties of obstructions generates the abnormality warning signal and transmits it to the far-end server 30 whereby the far-end server 30 displays the abnormality warning signal. The monitoring staffs check whether sensors are abnormal according to the abnormality warning signal.

Referring to FIG. 1, the procedure of the comparison condition for detecting the signal delays of obstructions is performed in the abnormality estimating unit 27 for detecting the signal delays of obstructions to determine whether signals transmitted by sensor are delayed. The procedure of the comparison condition for detecting the signal delays of obstructions is described as follows. The abnormality estimating unit 27 for detecting the signal delays of obstructions receives the appearing time and the relative distances thereof of obstructions at the same time point. The abnormality estimating unit 27 for detecting the signal delays of obstructions generates the abnormality warning signal when either the appearing time and the relative distances thereof of obstructions estimated by one of the lidar information, the radar information, and the camera information non-correspond to either the appearing time and the relative distances thereof of obstructions estimated by the remains of the lidar information, the radar information, and the camera information at the same time point. The appearing time and the relative distances thereof of obstructions are presently recorded by the system. For example, the appearing time and the relative distances thereof of obstructions estimated by the lidar information and the camera information mark a moving vehicle appearing 10 minutes later after retrieving images. However, the appearing time and the relative distances thereof of obstructions estimated by the radar information mark a moving vehicle appearing 12 minutes later after retrieving images. As a result, the appearing time and the relative distances thereof of obstructions estimated by the radar information are different from the appearing time and the relative distances thereof of obstructions estimated by the lidar information and the camera information. The detection signals of radars may be delayed. Thus, the abnormality estimating unit 27 for detecting the signal delays of obstructions generates the abnormality warning signal and transmits it to the far-end server 30 whereby the far-end server 30 displays the abnormality warning signal. The monitoring staffs check whether lidars, cameras, and radars are abnormal according to the abnormality warning signal. The abnormality estimating unit 27 for detecting the signal delays of obstructions receives the appearing time and the relative distances thereof of obstructions a few minutes earlier, and receives the appearing time and the relative distances thereof of obstructions at present, but the present invention is not limited thereto.

Referring to FIG. 1, the procedure of the comparison condition for estimating dynamic abnormality is performed in the dynamic abnormality estimating unit 26 and described as follows. The dynamic abnormality estimating unit 26 estimates lateral dynamic abnormality and longitudinal dynamic abnormality.

Figure 5:
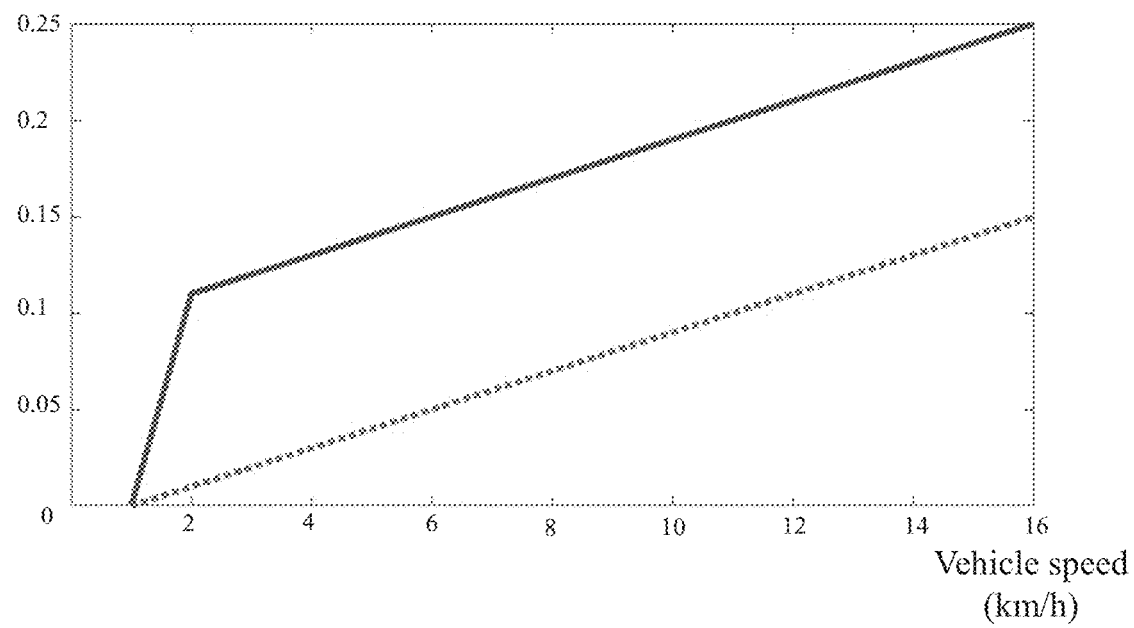
FIG. 5 is a diagram illustrating a run chart showing a comparison of longitudinal dynamic abnormalities according to an embodiment of the present invention.

The dynamic abnormality estimating unit 26 estimates longitudinal dynamic abnormality, referring to FIG. 5. The dynamic abnormality estimating unit 26 retrieves the vehicle speed and the power output of the vehicle-parameter information and determines whether the vehicle speed and the power output of the vehicle-parameter information correspond to a power graph. If the answer is no, the dynamic abnormality estimating unit 26 generates the abnormality warning signal and transmits it to the far-end server 30 whereby the far-end server 30 displays the abnormality warning signal. In one embodiment, the power output is current output and the power graph includes a run chart showing information of a historical vehicle speed and historical power output. As shown in FIG. 5, the dynamic abnormality estimating unit 26 compares a run chart showing information of the vehicle speed and the power output of the vehicle-parameter information with the run chart showing information of the historical vehicle speed and the historical power output. If the curves of the run charts are not fitted to each other, the dynamic abnormality estimating unit 26 generates the abnormality warning signal.

Figure 6A:
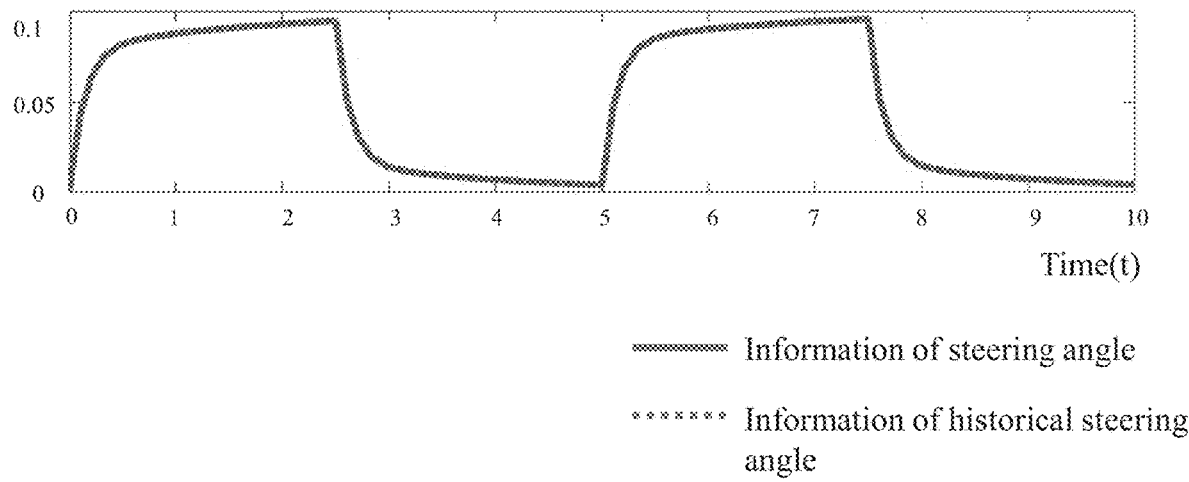
FIGS. 6A-6B are diagrams illustrating run charts showing a comparison of lateral dynamic abnormalities according to an embodiment of the present invention.
Figure 6B:
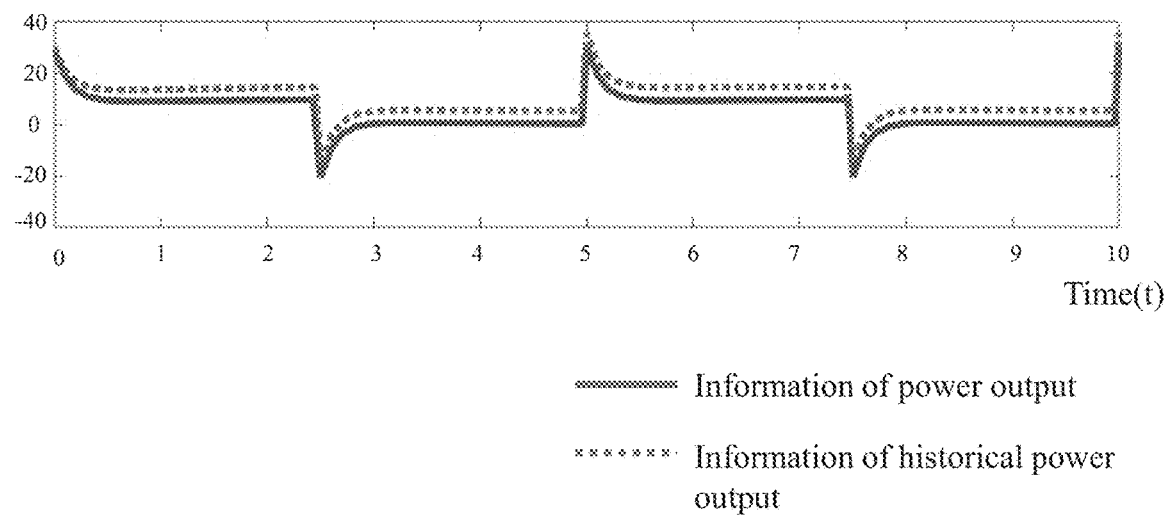

The dynamic abnormality estimating unit 26 estimates lateral dynamic abnormality, referring to FIG. 6A and FIG. 6B. The dynamic abnormality estimating unit 26 retrieves the steering angle and the power output of the vehicle-parameter information and determines whether the steering angle and the power output of the vehicle-parameter information correspond to a steering graph, wherein the steering graph includes a run chart showing information of a historical steering angle and historical power output. If the answer is no, the dynamic abnormality estimating unit 26 generates the abnormality warning signal and transmits it to the far-end server 30 whereby the far-end server 30 displays the abnormality warning signal. In one embodiment, the power output is current output and the steering graph includes a run chart showing information of a historical steering angle and historical power output. As shown in FIG. 6A, the dynamic abnormality estimating unit 26 obtains the corresponding run chart of the historical steering angle based on the run chart of the steering angle of the vehicle-parameter information when estimating lateral dynamic abnormality. As shown in FIG. 6B, the run chart of the historical power output corresponding to the run chart of the historical steering angle is retrieved to compare the historical power output with the power output of the vehicle-parameter information. If the curves of the historical power output and the power output of the vehicle-parameter information are not fitted to each other, the dynamic abnormality estimating unit 26 generates the abnormality warning signal.

In conclusion, the present invention collects the on-board system information of an on-board system at the back end and estimates the states of all systems mounted in the autonomous vehicle according to the on-board system information, so as to detect the dynamic abnormality for driving the vehicle and the abnormality of sensing systems of the autonomous vehicle in advance, thereby effectively improving the driving safety of the self-driving system. In addition, the present invention collects all big data of autonomous vehicles at the back end and effectively remotely monitors the vehicles, such as recording the movements of vehicles or estimating the driving states of vehicles. On the other hand, the back end performs real-time monitoring, dispatches mass transit fleets, remotely controls vehicles, or takes emergency measures according to statistic analyzed results, thereby managing the fleets of autonomous vehicles.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A system for remotely monitoring an autonomous vehicle receiving on-board system information transmitted by an on-board system, and the system comprising:
  a processor configured to:
    receive the on-board system information;
    retrieve raw vehicle-body data of the on-board system information and filter out the raw vehicle-body data unsatisfying with a threshold value to generate vehicle-parameter information;
    estimate vehicle-body environment information based on the vehicle-parameter information; and
    incorporate the vehicle-parameter information and the vehicle-body environment information into a comparison condition to generate a comparison result, and generate an abnormality warning signal corresponding to the comparison result; and
  a far-end server coupled to the processor and configured to receive and display the abnormality warning signal.

2. The system for remotely monitoring the autonomous vehicle of claim 1, wherein the vehicle-parameter information includes information of a state of charge (SOC), information of a vehicle speed, information of a steering angle, position information, lidar information, radar information, camera information, braking information, information of power output, either manual-driving state information or self-driving state information, mileage information, and information of diagnosing an on-board system; the vehicle-body environment information includes information of a vehicle trajectory, information of a state of decreasing charge, information of distances of obstructions, information of number of obstructions, information of varieties of obstructions, and information of appearing time and relative distances thereof of obstructions; and the processor is configured to estimate the vehicle trajectory based on the vehicle speed and the steering angle, estimate the state of decreasing charge based on the SOC and the mileage information, estimate the distances of obstructions, the number of obstructions, and either the appearing time and the relative distances thereof of obstructions based on the lidar information, the radar information, and the camera information, and estimate the varieties of obstructions based on the camera information.

3. The system for remotely monitoring the autonomous vehicle of claim 2, wherein the processor sets the comparison condition for estimating snaking abnormality, and the comparison condition including the vehicle speed, the steering angle, and the vehicle trajectory retrieved by the processor after determining the vehicle in a self-driving state according to the manual-driving state information or the self-driving state information; the processor determining whether that the vehicle speed is larger than a given real-time vehicle speed, that the steering angle is larger than a given real-time steering angle, and that a different between the vehicle trajectory and a given trajectory is larger than a real-time trajectory error: if yes, generating the abnormality warning signal; and if no, retrieving the position information and comparing the position information with a given historical steering angle and a given historical trajectory, and the processor generating the abnormality warning signal when the steering angle of the vehicle-parameter information is larger than the given historical steering angle and a difference between the vehicle trajectory and the given historical trajectory is larger than a historical trajectory error.

4. The system for remotely monitoring the autonomous vehicle of claim 2, wherein the processor sets the comparison condition for estimating battery health, the comparison condition including the state of decreasing charge retrieved by the processor, and the processor determining whether the state of decreasing charge is larger than a given state of decreasing charge: if yes, generating the abnormality warning signal; and if no, further comparing the state of decreasing charge of the vehicle-parameter information with a given historical state of decreasing charge, and the processor generating the abnormality warning signal when the state of decreasing charge of the vehicle-parameter information is larger than the given historical state of decreasing charge.

5. The system for remotely monitoring the autonomous vehicle of claim 2, wherein the processor sets the comparison condition for detecting the distances of obstructions, the comparison condition including the distances of obstructions received by the processor at a same time point; and the processor generating the abnormality warning signal when the distances of obstructions estimated by one of the lidar information, the radar information, and the camera information non-correspond to the distances of obstructions estimated by remains of the lidar information, the radar information, and the camera information at a same time point.

6. The system for remotely monitoring the autonomous vehicle of claim 2, wherein the processor sets the comparison condition for detecting the number of obstructions, and the comparison condition including the number of obstructions received by the processor at a same time point; and the processor generating the abnormality warning signal when the number of obstructions estimated by one of the lidar information, the radar information, and the camera information non-corresponds to the number of obstructions estimated by remains of the lidar information, the radar information, and the camera information at a same time point.

7. The system for remotely monitoring the autonomous vehicle of claim 2, wherein the processor sets the comparison condition for detecting the varieties of obstructions, and the comparison condition including the varieties of obstructions received by the processor at a same time point; and the processor generating the abnormality warning signal when one of the varieties of obstructions non-corresponds to remains of the varieties of obstructions at a same time point.

8. The system for remotely monitoring the autonomous vehicle of claim 2, wherein the processor sets the comparison condition for detecting signal delays of obstructions, and the comparison condition including either the appearing time and the relative distances thereof of obstructions received by the processor at a same time point; and the processor generating the abnormality warning signal when either the appearing time and the relative distances thereof of obstructions estimated by one of the lidar information, the radar information, and the camera information non-correspond to either the appearing time and the relative distances thereof of obstructions estimated by remains of the lidar information, the radar information, and the camera information at a same time point.

9. The system for remotely monitoring the autonomous vehicle of claim 2, wherein the processor sets the comparison condition for estimating dynamic abnormality, and the processor determining whether the vehicle speed and the power output correspond to a power graph: if no, generating the abnormality warning signal, wherein the power graph includes a run chart showing information of a historical vehicle speed and historical power output; or the processor determining whether the steering angle and the power output correspond to a steering graph: if no, generating the abnormality warning signal, wherein the steering graph includes a run chart showing information of a historical steering angle and historical power output.

10. The system for remotely monitoring the autonomous vehicle of claim 2, wherein the far-end server receives and displays information of diagnosing an on-board system of the on-board system information.

11. A method for remotely monitoring an autonomous vehicle comprising:
receiving on-board system information;
retrieving raw vehicle-body data of the on-board system information and filtering out the raw vehicle-body data unsatisfying with a threshold value to generate vehicle-parameter information;
estimating vehicle-body environment information based on the vehicle-parameter information; and
incorporating the vehicle-parameter information and the vehicle-body environment information into a comparison condition to generate a comparison result and generating an abnormality warning signal corresponding to the comparison result.

12. The method for remotely monitoring the autonomous vehicle of claim 11, wherein the vehicle-parameter information includes information of a state of charge (SOC), information of a vehicle speed, information of a steering angle, position information, lidar information, radar information, camera information, braking information, information of power output, either manual-driving state information or self-driving state information, mileage information, and information of diagnosing an on-board system; the vehicle-body environment information includes information of a vehicle trajectory, information of a state of decreasing charge, information of distances of obstructions, information of number of obstructions, information of varieties of obstructions, and information of appearing time and relative distances thereof of obstructions; and the vehicle trajectory is estimated based on the vehicle speed and the steering angle, the state of decreasing charge is estimated based on the SOC and the mileage information, the distances of obstructions, the number of obstructions, and either the appearing time and the relative distances thereof of obstructions are estimated based on the lidar information, the radar information, and the camera information, and the varieties of obstructions are estimated based on the camera information.

13. The method for remotely monitoring the autonomous vehicle of claim 12, wherein the step of incorporating the vehicle-parameter information and the vehicle-body environment information into the comparison condition for estimating snaking abnormality to generate the comparison result and generating the abnormality warning signal comprises:
  determining the vehicle in a self-driving state according to the manual-driving state information or the self-driving state information;
  retrieving the vehicle speed, the steering angle, and the vehicle trajectory; and
  determining whether that the vehicle speed is larger than a given real-time vehicle speed, that the steering angle is larger than a given real-time steering angle, and that a different between the vehicle trajectory and a given trajectory is larger than a real-time trajectory error:
    if yes, generating the abnormality warning signal; and
    if no, retrieving the position information and comparing the position information with a given historical steering angle and a given historical trajectory in a same position, and generating the abnormality warning signal when the steering angle of the vehicle-parameter information is larger than the given historical steering angle and a difference between the vehicle trajectory and the given historical trajectory is larger than a historical trajectory error.

14. The method for remotely monitoring the autonomous vehicle of claim 12, wherein the step of incorporating the vehicle-parameter information and the vehicle-body environment information into the comparison condition for estimating battery health to generate the comparison result and generating the abnormality warning signal comprises:
  retrieving the state of decreasing charge; and
  determining whether the state of decreasing charge is larger than a given state of decreasing charge:
    if yes, generating the abnormality warning signal; and
    if no, comparing the state of decreasing charge of the vehicle-parameter information with a given historical state of decreasing charge, and generating the abnormality warning signal when the state of decreasing charge of the vehicle-parameter information is larger than the given historical state of decreasing charge.

15. The method for remotely monitoring the autonomous vehicle of claim 12, wherein the step of incorporating the vehicle-parameter information and the vehicle-body environment information into the comparison condition for detecting the distances of obstructions to generate the comparison result and generating the abnormality warning signal comprises:
  receiving the distances of obstructions at a same time point; and
  generating the abnormality warning signal when the distances of obstructions estimated by one of the lidar information, the radar information, and the camera information non-correspond to the distances of obstructions estimated by remains of the lidar information, the radar information, and the camera information at a same time point.

16. The method for remotely monitoring the autonomous vehicle of claim 12, wherein the step of incorporating the vehicle-parameter information and the vehicle-body environment information into the comparison condition for detecting the number of obstructions to generate the comparison result and generating the abnormality warning signal comprises:
  receiving the number of obstructions at a same time point; and
  generating the abnormality warning signal when the number of obstructions estimated by one of the lidar information, the radar information, and the camera information non-corresponds to the number of obstructions estimated by remains of the lidar information, the radar information, and the camera information at a same time point.

17. The method for remotely monitoring the autonomous vehicle of claim 12, wherein the step of incorporating the vehicle-parameter information and the vehicle-body environment information into the comparison condition for detecting the varieties of obstructions to generate the comparison result and generating the abnormality warning signal comprises:
  receiving the varieties of obstructions at a same time point; and
  generating the abnormality warning signal when one of the varieties of obstructions non-corresponds to remains of the varieties of obstructions at a same time point.

18. The method for remotely monitoring the autonomous vehicle of claim 12, wherein the comparison condition is used for detecting signal delays of obstructions, and the step of incorporating the vehicle-parameter information and the vehicle-body environment information into the comparison condition to generate the comparison result and generating the abnormality warning signal comprises:
  receiving either the appearing time and the relative distances thereof of obstructions at a same time point; and
  generating the abnormality warning signal when either the appearing time and the relative distances thereof of obstructions estimated by one of the lidar information, the radar information, and the camera information non-correspond to either the appearing time and the relative distances thereof of obstructions estimated by remains of the lidar information, the radar information, and the camera information at a same time point.

19. The method for remotely monitoring the autonomous vehicle of claim 12, wherein the comparison condition is used for estimating dynamic abnormality, and the step of incorporating the vehicle-parameter information and the vehicle-body environment information into the comparison condition to generate the comparison result and generating the abnormality warning signal comprises:

determining whether the vehicle speed and the power output correspond to a power graph: if no, generating the abnormality warning signal, wherein the power graph includes a run chart showing information of a historical vehicle speed and historical power output.

20. The method for remotely monitoring the autonomous vehicle of claim 12, wherein the comparison condition is used for estimating dynamic abnormality, and the step of incorporating the vehicle-parameter information and the vehicle-body environment information into the comparison condition to generate the comparison result and generating the abnormality warning signal comprises:

determining whether the steering angle and the power output correspond to a steering graph: if no, generating the abnormality warning signal, wherein the steering graph includes a run chart showing information of a historical steering angle and historical power output.

* * * * *